United States Patent
Long

(10) Patent No.: US 6,430,487 B1
(45) Date of Patent: Aug. 6, 2002

(54) SATELLITE TRACKING VELOCITY RECORDER

(76) Inventor: Eric R. Long, 848 Jordache Dr., Loveland, CO (US) 80538

( * ) Notice: Subject to any disclaimer, the term of this patent is extended or adjusted under 35 U.S.C. 154(b) by 0 days.

(21) Appl. No.: 09/931,832

(22) Filed: Aug. 17, 2001

(51) Int. Cl.$^7$ .............................................. G06F 17/00
(52) U.S. Cl. ...................................... 701/35; 701/207
(58) Field of Search ............................. 701/35, 23, 24, 701/200, 207–213, 116, 300; 318/582; 244/3.18

(56) References Cited

U.S. PATENT DOCUMENTS

| | | | |
|---|---|---|---|
| 6,115,655 A | * | 9/1909 | Kieth et al. .................. 701/35 |
| 4,853,856 A | | 8/1989 | Hanway |
| 5,383,127 A | | 1/1995 | Shibata |
| D366,220 S | | 1/1996 | Sakamoto |
| 5,539,645 A | | 7/1996 | Mandhyan et al. |
| 5,610,815 A | | 3/1997 | Gudat et al. |
| 5,684,476 A | | 11/1997 | Anderson |
| 6,088,636 A | * | 7/2000 | Chigumira et al. ........... 701/35 |

* cited by examiner

Primary Examiner—Richard M. Camby

(57) ABSTRACT

A satellite tracking velocity recorder includes a housing that has a perimeter wall. The housing is for coupling to the vehicle. A plurality of ports is coupled to the perimeter wall of the housing. Each of the ports is for coupling to one of a plurality of external devices. A processor assembly is positioned within the housing. The processor assembly is operationally coupled to the ports. The processor assembly is for processing information from at least one of the external devices when the external devices are coupled to the ports. The processor assembly is for transmitting information to at least one of the external devices when the external devices are coupled to the ports. The processor assembly is for recording location, speed, date and time of the vehicle. A power supply is operationally coupled to the processor assembly. The power supply is for supplying power to the processor assembly.

9 Claims, 4 Drawing Sheets

SATELLITE TRACKING VELOCITY RECORDER

BACKGROUND OF THE INVENTION

1. Field of the Invention

The present invention relates to velocity and position recording systems and more particularly pertains to a new satellite tracking velocity recorder for allowing a user to accurately monitor the speed and position of vehicles.

2. Description of the Prior Art

The use of velocity and position recording systems is known in the prior art. More specifically, velocity and position recording systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,853,856; U.S. Pat. No. 5,610,815; U.S. Pat. No. 5,684,476; U.S. Pat. No. 5,383,127; U.S. Pat. No. 5,539,645; and U.S. Pat. No. Des. 366,220.

While these devices fulfill their respective, particular objectives and requirements, the aforementioned patents do not disclose a new satellite tracking velocity recorder. The inventive device includes a housing that has a perimeter wall. The perimeter wall is adapted for coupling to the vehicle. The housing is adapted for coupling to the vehicle. A plurality of ports is coupled to the perimeter wall of the housing. Each of the ports is adapted for coupling to one of a plurality of external devices. A processor assembly is positioned within the housing. The processor assembly is operationally coupled to the ports. The processor assembly is adapted for processing information from at least one of the external devices when the external devices are coupled to the ports. The processor assembly is adapted for transmitting information to at least one of the external devices when the external devices are coupled to the ports. The processor assembly is for recording location, speed, date and time of the vehicle. A power supply is operationally coupled to the processor assembly. The power supply is for supplying power to the processor assembly.

In these respects, the satellite tracking velocity recorder according to the present invention substantially departs from the conventional concepts and designs of the prior art, and in so doing provides an apparatus primarily developed for the purpose of allowing a user to accurately monitor the speed and position of vehicles.

SUMMARY OF THE INVENTION

In view of the foregoing disadvantages inherent in the known types of velocity and position recording systems now present in the prior art, the present invention provides a new satellite tracking velocity recorder construction wherein the same can be utilized for allowing a user to accurately monitor the speed and position of vehicles.

The general purpose of the present invention, which will be described subsequently in greater detail, is to provide a new satellite tracking velocity recorder apparatus and method which has many of the advantages of the velocity and position recording systems mentioned heretofore and many novel features that result in a new satellite tracking velocity recorder which is not anticipated, rendered obvious, suggested, or even implied by any of the prior art velocity and position recording systems, either alone or in any combination thereof.

To attain this, the present invention generally comprises a housing that has a perimeter wall. The perimeter wall is adapted for coupling to the vehicle. The housing is adapted for coupling to the vehicle. A plurality of ports is coupled to the perimeter wall of the housing. Each of the ports is adapted for coupling to one of a plurality of external devices. A processor assembly is positioned within the housing. The processor assembly is operationally coupled to the ports. The processor assembly is adapted for processing information from at least one of the external devices when the external devices are coupled to the ports. The processor assembly is adapted for transmitting information to at least one of the external devices when the external devices are coupled to the ports. The processor assembly is for recording location, speed, date and time of the vehicle. A power supply is operationally coupled to the processor assembly. The power supply is for supplying power to the processor assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new satellite tracking velocity recorder apparatus and method which has many of the advantages of the velocity and position recording systems mentioned heretofore and many novel features that result in a new satellite tracking velocity recorder which is not anticipated, rendered obvious, suggested, or even implied by any of the prior art velocity and position recording systems, either alone or in any combination thereof.

It is another object of the present invention to provide a new satellite tracking velocity recorder, which may be easily and efficiently manufactured and marketed.

It is a further object of the present invention to provide a new satellite tracking velocity recorder, which is of a durable and reliable construction.

An even further object of the present invention is to provide a new satellite tracking velocity recorder which is susceptible of a low cost of manufacture with regard to both materials and labor, and which accordingly is then susceptible of low prices of sale to the consuming public, thereby making such satellite tracking velocity recorder economically available to the buying public.

Still yet another object of the present invention is to provide a new satellite tracking velocity recorder, which provides in the apparatuses and methods of the prior art some of the advantages thereof, while simultaneously overcoming some of the disadvantages normally associated therewith.

Still another object of the present invention is to provide a new satellite tracking velocity recorder for allowing a user to accurately monitor the speed and position of vehicles.

Yet another object of the present invention is to provide a new satellite tracking velocity recorder, which includes a housing that has a perimeter wall. The perimeter wall is adapted for coupling to the vehicle. The housing is adapted for coupling to the vehicle. A plurality of ports is coupled to the perimeter wall of the housing. Each of the ports is adapted for coupling to one of a plurality of external devices. A processor assembly is positioned within the housing. The processor assembly is operationally coupled to the ports. The processor assembly is adapted for processing information from at least one of the external devices when the external devices are coupled to the ports. The processor assembly is adapted for transmitting information to at least one of the external devices when the external devices are coupled to the ports. The processor assembly is for recording location, speed, date and time of the vehicle. A power supply is operationally coupled to the processor assembly. The power supply is for supplying power to the processor assembly.

Still yet another object of the present invention is to provide a new satellite tracking velocity recorder that gives irrefutable, concrete evidence that could exonerate drivers accused of speeding or causing an accident.

Even still another object of the present invention is to provide a new satellite tracking velocity recorder that would not require calibration of police radar, and would be more accurate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
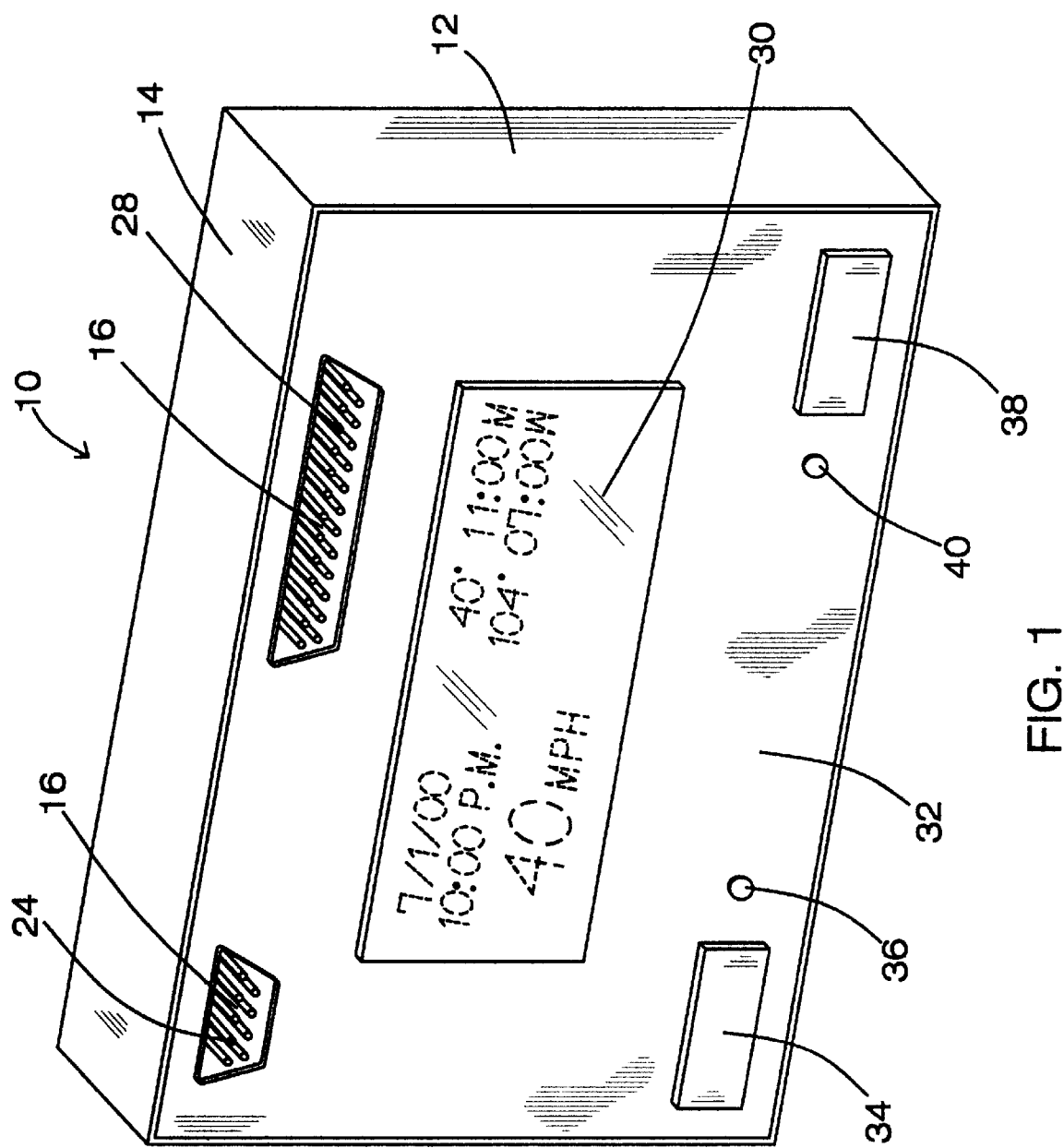
FIG. 1 is a perspective view of a new satellite tracking velocity recorder according to the present invention.
Figure 2:
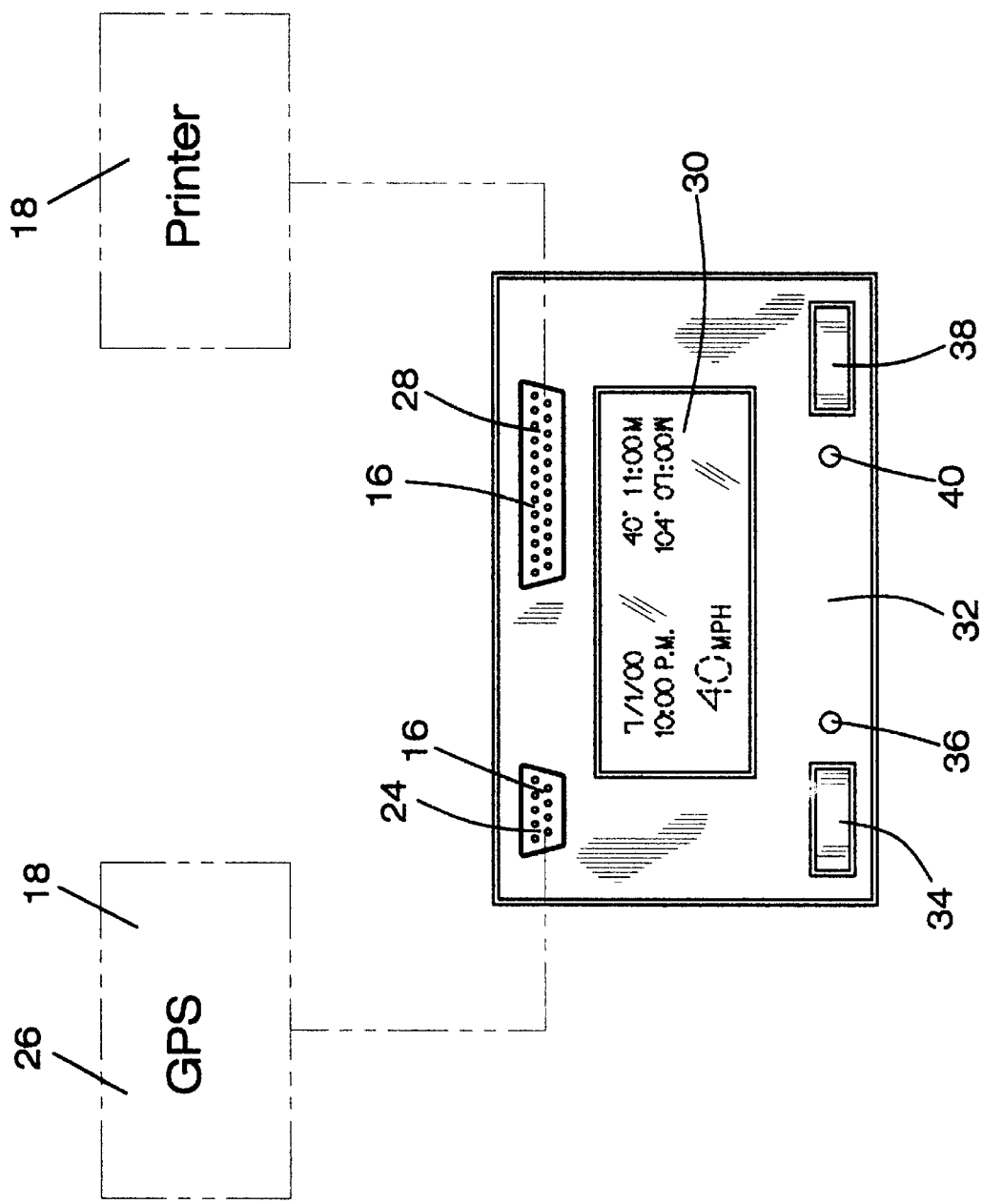
FIG. 2 is a front view of the present invention.
Figure 3:
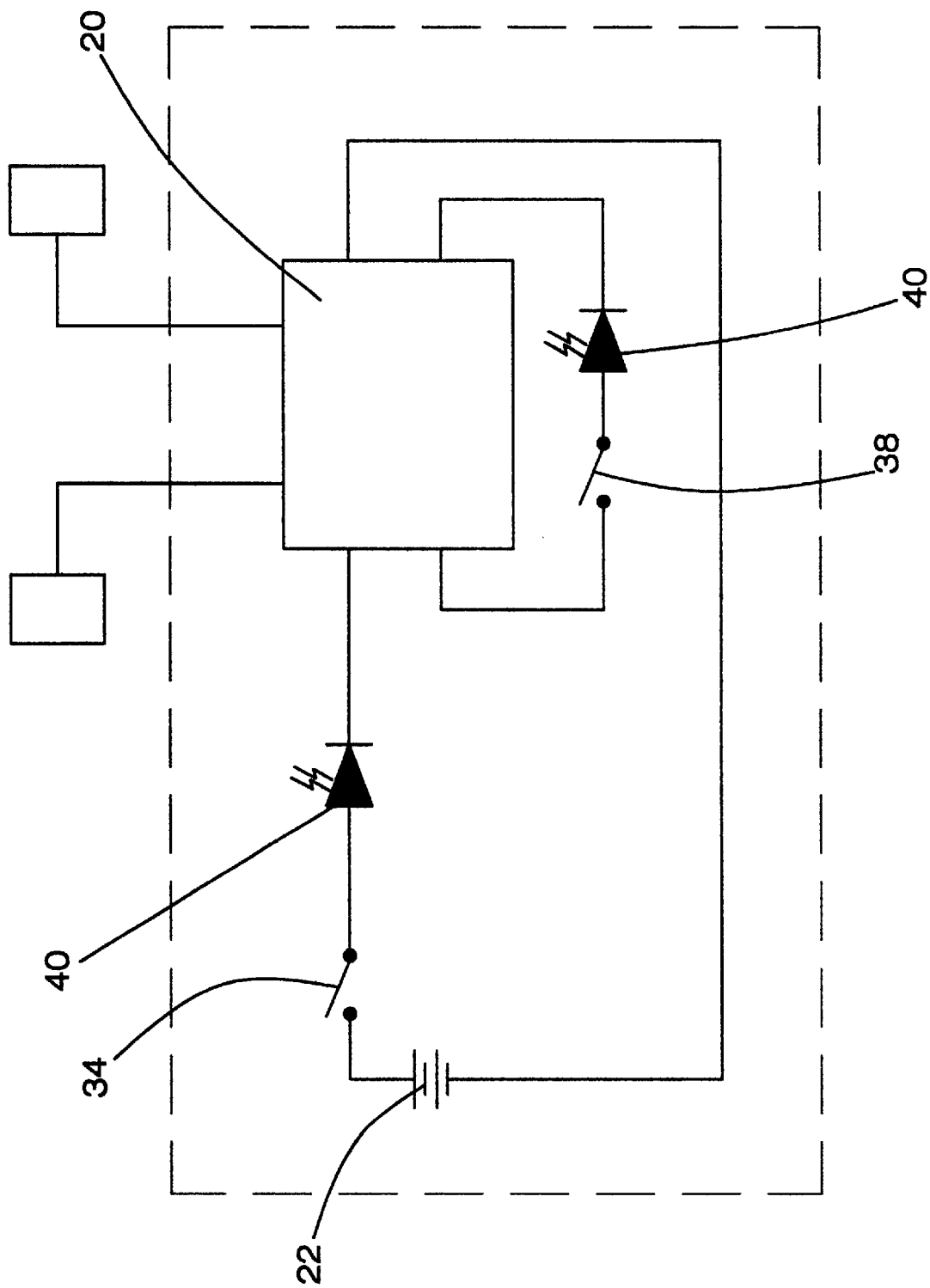
FIG. 3 is a schematic diagram of the present invention.
Figure 4:
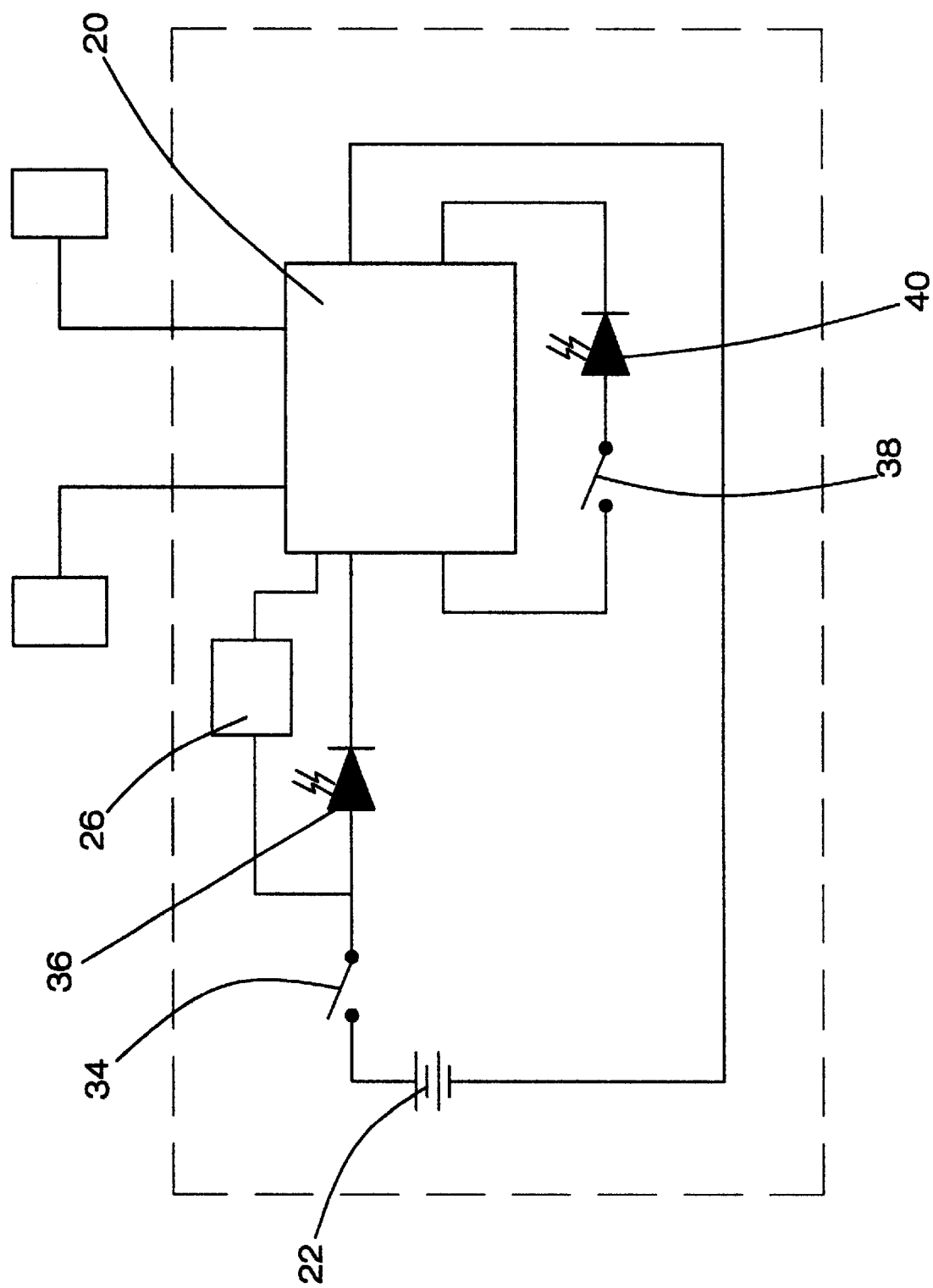
FIG. 4 is a schematic diagram of the present invention.

With reference now to the drawings, and in particular to FIGS. 1 through 4 thereof, a new satellite tracking velocity recorder embodying the principles and concepts of the present invention and generally designated by the reference numeral 10 will be described.

As best illustrated in FIGS. 1 through 4, the satellite tracking velocity recorder 10 generally includes a housing 12 that has a perimeter wall 14. The perimeter wall 14 is adapted for coupling to the vehicle. The housing 12 is adapted for coupling to the vehicle. A plurality of ports 16 is coupled to the perimeter wall 14 of the housing 12. Each of the ports 16 is adapted for coupling to one of a plurality of external devices 18. A processor assembly 20 is positioned within the housing 12. The processor assembly 20 is operationally coupled to the ports 16. The processor assembly 20 is adapted for processing information from at least one of the external devices 18 when the external devices 18 are coupled to the ports 16. The processor assembly 20 is adapted for transmitting information to at least one of the external devices 18 when the external devices 18 are coupled to the ports 16. The processor assembly 20 is for recording location, speed, date and time of the vehicle. A power supply 22 is operationally coupled to the processor assembly 20. The power supply 22 is for supplying power to the processor assembly 20.

The ports 16 include an input port 24. The input port 24 is coupled to the perimeter wall 14 of the housing 12. The input port 24 is adapted for coupling to one of the external devices 18. The processor assembly 20 is adapted for receiving positioning information from a global positioning system 26 coupled to the input port 24.

The ports 16 include an output port 28. The output port 28 is coupled to the perimeter wall 14 of the housing 12. The input port 24 is adapted for coupling one the external devices 18 such that the processor assembly 20 is adapted for transferring stored information to one of the external devices 18 coupled to the output port 28.

A visual display 30 is coupled to the perimeter wall 14 of the housing 12. The visual display 30 is operationally coupled to the processor assembly 20 such that the visual display 30 is adapted for visually displaying speed, location, date and time of the vehicle. The visual display 30 is coupled to a front wall 32 of the perimeter wall 14. The visual display 30 is adapted to be viewed by the user.

A power switch 34 is operationally coupled between the power supply 22 and the processor assembly 20. The user couples the power switch 34 to the perimeter wall 14 of the housing 12 such that the power switch 34 is actuatable. The power switch 34 is for selectively controlling power from the power supply 22 to the processor assembly 20. A power light 36 is coupled between the power switch 34 and the processor assembly 20. The power light 36 is adapted for emitting light when the user actuates the power switch 34 such that power is supplied to the processor assembly 20 and the power light 36. The power light 36 is coupled to the perimeter wall 14 of the housing 12 such that the power light 36 is adapted for indicating when power is supplied to the processor assembly 20.

A recording switch 38 is operationally coupled to the processor assembly 20. The recording switch 38 is coupled to the perimeter wall 14 of the housing 12 such that the recording switch 38 is adapted to be actuated by the user. The recording switch 38 is for initiating recording of the information by the processor assembly 20.

A recording light 40 is operationally coupled between the recording switch 38 and the processor assembly 20. The recording light 40 is adapted for emitting light when the processor assembly 20 actuates the recording switch 38 to initiate recording of the information. The recording light 40 is coupled to the perimeter wall 14 of the housing 12 such that the recording light 40 is adapted for indicating when the processor assembly 20 records the information.

In and embodiment the present invention would include a global positioning assembly 26 positioned within the housing 12. The global positioning assembly 26 is operationally coupled to the processor assembly 20. The global positioning assembly 26 is adapted to collect positioning information and transferring the positioning information to the processor assembly 20.

In use, the present invention would store vehicle information and display it on an LCD screen or provide a printout of the data. This speed and direction recording system would make use of a GPS receiver having a data link to a microprocessor unit for dedicated information storage, display, and printout capabilities. There would be no provision in this microprocessor unit for editing data thereby preserving its authenticity for legal considerations. Data collected in the present invention could be used to contest speeding tickets, verify speed and direction for accident situations, or simply to monitor the driver for proper vehicle operation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular velocity and position recording system for accurately determining the position and speed of a user's vehicle, the vehicular velocity and position recording system comprising:

a housing having a perimeter wall, said perimeter wall being adapted for coupling to the vehicle, said housing being adapted for coupling to the vehicle;

a plurality of ports being coupled to said perimeter wall of said housing, each of said ports being adapted for coupling to one of a plurality of external devices:

a processor assembly being positioned within said housing, said processor assembly being operationally coupled to said ports, said processor assembly being adapted for processing information from at least one of the external devices when the external devices are coupled to said ports, said processor assembly being adapted for transmitting information to at least one of the external devices when the external devices are coupled to said ports, said processor assembly being for recording location, speed, date and time of the vehicle;

a power supply being operationally coupled to said processor assembly, said power supply being for supplying power to said processor assembly;

a recording switch being operationally coupled to said processor assembly, said recording switch being coupled to said perimeter wall of said housing such that said recording switch is adapted for being actuated by the user, said recording switch being for initiating recording of the information by said processor assembly; and a recording light being operationally coupled between said recording switch and said processor assembly, said recording light being adapted for emitting light when said recording switch is actuated to initiate recording of the information by said processor assembly, said recording light being coupled to said perimeter wall of said housing such that said recording light is adapted for indicating when the information is being recorded by said processor assembly.

2. The vehicular velocity and position recording system as set forth in claim 1, further comprising:

said ports comprising an input port, said input port being coupled to said perimeter wall of said housing, said input port being adapted for coupling to one of the external devices, said processor assembly being adapted for receiving positioning information from a global positioning system coupled to said input port.

3. The vehicular velocity and position recording system as set forth in claim 1, further comprising:

said ports comprising an output port, said output port being coupled to said perimeter wall of said housing, said input port being adapted for coupling one the external devices such that said processor assembly is adapted for transferring stored information to one of the external devices coupled to said output port.

4. The vehicular velocity and position recording system as set forth in claim 1, further comprising:

a visual display being coupled to said perimeter wall of said housing, said visual display being operationally coupled to said processor assembly such that said visual display is adapted for visually displaying speed, location, date and time of the vehicle.

5. The vehicular velocity and position recording system as set forth in claim 4, further comprising:

said visual display being coupled to a front wall of said perimeter wall, said visual display being adapted for being viewed by the user.

6. The vehicular velocity and position recording system as set forth in claim 1, further comprising:

a power switch being operationally coupled between said power supply and said processor assembly, said power switch being coupled to said perimeter wall of said housing such that said power switch is actuatable by the user, said power switch being for selectively controlling power from said power supply to said processor assembly.

7. The vehicular velocity and position recording system as set forth in claim 6, further comprising:

a power light being coupled between said power switch and said processor assembly, said power light being adapted for emitting light when said power switch is actuated by the user such that power is being supplied to said processor assembly and said power light, said power light being coupled to said perimeter wall of said housing such that said power light is adapted for indicating when power is being supplied to said processor assembly.

8. The vehicular velocity and position recording system as set forth in claim 1, further comprising:

a global positioning assembly being positioned within said housing, said global positioning assembly being operationally coupled to said processor assembly, said global positioning assembly being adapted for being collecting positioning information and transferring the positioning information to said processor assembly.

9. A vehicular velocity and position recording system for accurately determining the position and speed of a user's vehicle, the vehicular velocity and position recording system comprising:

a housing having a perimeter wall, said perimeter wall being adapted for coupling to the vehicle, said housing being adapted for coupling to the vehicle;

a plurality of ports being coupled to said perimeter wall of said housing, each of said ports being adapted for coupling to one of a plurality of external devices:

a processor assembly being positioned within said housing, said processor assembly being operationally coupled to said ports, said processor assembly being adapted for processing information from at least one of the external devices when the external devices are coupled to said ports, said processor assembly being adapted for transmitting information to at least one of the external devices when the external devices are coupled to said ports, said processor assembly being for recording location, speed, date and time of the vehicle; and a power supply being operationally coupled to said processor assembly, said power supply being for supplying power to said processor assembly;

wherein said ports comprising an input port, said input port being coupled to said perimeter wall of said housing, said input port being adapted for coupling to one of the external devices, said processor assembly being adapted for receiving positioning information from a global positioning system coupled to said input port;

wherein said ports comprising an output port, said output port being coupled to said perimeter wall of said housing, said input port being adapted for coupling one the external devices such that said processor assembly is adapted for transferring stored information to one of the external devices coupled to said output port;

wherein a visual display being coupled to said perimeter wall of said housing, said visual display being operationally coupled to said processor assembly such that said visual display is adapted for visually displaying speed, location, date and time of the vehicle;

wherein said visual display being coupled to a front wall of said perimeter wall, said visual display being adapted for being viewed by the user;

wherein a power switch being operationally coupled between said power supply and said processor assembly, said power switch being coupled to said perimeter wall of said housing such that said power switch is actuatable by the user, said power switch being for selectively controlling power from said power supply to said processor assembly;

wherein a power light being coupled between said power switch and said processor assembly, said power light being adapted for emitting light when said power switch is actuated by the user such that power is being supplied to said processor assembly and said power light, said power light being coupled to said perimeter wall of said housing such that said power light is adapted for indicating when power is being supplied to said processor assembly;

wherein a recording switch being operationally coupled to said processor assembly, said recording switch being coupled to said perimeter wall of said housing such that said recording switch is adapted for being actuated by the user, said recording switch being for initiating recording of the information by said processor assembly;

wherein a recording light being operationally coupled between said recording switch and said processor assembly, said recording light being adapted for emitting light when said recording switch is actuated to initiate recording of the information by said processor assembly, said recording light being coupled to said perimeter wall of said housing such that said recording light is adapted for indicating when the information is being recorded by said processor assembly.

* * * * *